(12) United States Patent
Ruehle et al.

(10) Patent No.: US 10,608,304 B2
(45) Date of Patent: Mar. 31, 2020

(54) BATTERY HAVING A PLURALITY OF BATTERY CELLS

(71) Applicant: Robert Bosch GmbH, Stuttgart (DE)

(72) Inventors: Andreas Ruehle, Bietigheim-Bissingen (DE); Claus Gerald Pflueger, Markgröningen (DE); Markus Schmitt, Tamm (DE); Peter Bauckhage, Ilsfeld (DE); Torsten Koller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 15/961,185

(22) Filed: Apr. 24, 2018

(65) Prior Publication Data

US 2018/0316073 A1    Nov. 1, 2018

(30) Foreign Application Priority Data

Apr. 28, 2017   (DE) .......................... 10 2017 207 188

(51) Int. Cl.
*H01M 10/6557*    (2014.01)
*H01M 10/613*     (2014.01)
*H01M 10/6567*    (2014.01)
*H01M 10/647*     (2014.01)
(Continued)

(52) U.S. Cl.
CPC ..... *H01M 10/6557* (2015.04); *H01M 2/1016* (2013.01); *H01M 2/1077* (2013.01); *H01M 2/202* (2013.01); *H01M 2/206* (2013.01); *H01M 10/613* (2015.04); *H01M 10/6567* (2015.04); *H01M 10/647* (2015.04)

(58) Field of Classification Search
None
See application file for complete search history.

(56) References Cited

U.S. PATENT DOCUMENTS

| 6,479,185 B1 * | 11/2002 | Hilderbrand ........ H01M 2/1077 |
|---|---|---|
| | | 429/148 |
| 8,663,828 B2 * | 3/2014 | Payne ................. H01M 10/486 |
| | | 429/120 |
| 9,070,958 B2 * | 6/2015 | Obasih .............. H01M 10/6556 |

(Continued)

FOREIGN PATENT DOCUMENTS

| CA | 2976877 A1 | 8/2016 |
|---|---|---|
| DE | 102013218489 | 3/2015 |

(Continued)

*Primary Examiner* — Scott J. Chmielecki
(74) *Attorney, Agent, or Firm* — Michael Best & Friedrich LLP

(57) ABSTRACT

A battery having a plurality of battery cells accommodated in a housing, wherein a plurality of first battery cells are electrically connected to one another in series and/or in parallel, and a plurality of second battery cells are electrically connected to one another in series and/or in parallel, wherein the first battery cells each have a first outer surface and the second battery cells each have a second outer surface, wherein the housing of the battery has a first housing wall and a second housing wall, which is arranged opposite the first housing wall, wherein a first flow channel is formed between the first wall of the housing and the first outer surface of one of the first battery cells, and wherein a second flow channel is formed between the second wall of the housing and the second outer surface of one of the second battery cells.

18 Claims, 7 Drawing Sheets

(51) Int. Cl.
    *H01M 2/10*    (2006.01)
    *H01M 2/20*    (2006.01)

(56) References Cited

U.S. PATENT DOCUMENTS

| | | | | |
|---|---|---|---|---|
| 9,368,845 | B2* | 6/2016 | Jairazbhoy | H01M 10/613 |
| 9,397,324 | B2* | 7/2016 | Favaretto | H01M 2/1077 |
| 9,786,966 | B2* | 10/2017 | Burrows | H01M 10/613 |
| 10,177,422 | B2* | 1/2019 | Lee | H01M 2/1077 |
| 2011/0135993 | A1* | 6/2011 | An | H01M 2/1077 |
| | | | | 429/156 |
| 2011/0151298 | A1* | 6/2011 | Kim | H01M 2/1077 |
| | | | | 429/99 |
| 2011/0262785 | A1* | 10/2011 | Johnson | H01M 2/1077 |
| | | | | 429/66 |
| 2011/0274958 | A1* | 11/2011 | Iritani | H01M 10/6551 |
| | | | | 429/120 |
| 2012/0028099 | A1* | 2/2012 | Aoki | H01M 2/1077 |
| | | | | 429/120 |
| 2013/0011713 | A1* | 1/2013 | Harada | H01M 2/1077 |
| | | | | 429/120 |
| 2013/0011719 | A1* | 1/2013 | Yasui | H01M 2/0245 |
| | | | | 429/159 |
| 2013/0280566 | A1* | 10/2013 | Chung | H01M 2/1077 |
| | | | | 429/83 |
| 2013/0288099 | A1* | 10/2013 | Kim | H01M 2/1077 |
| | | | | 429/120 |
| 2015/0125723 | A1 | 5/2015 | You et al. | |
| 2015/0357614 | A1* | 12/2015 | Sohn, II | H01M 2/1072 |
| | | | | 429/100 |
| 2016/0226053 | A1 | 8/2016 | Wu et al. | |
| 2017/0025724 | A1* | 1/2017 | Okada | H01M 10/625 |
| 2017/0187083 | A1* | 6/2017 | Mueller | H01M 2/1077 |
| 2018/0138560 | A1* | 5/2018 | Bessho | H01M 10/6563 |
| 2018/0351151 | A1* | 12/2018 | Marchal | B60L 3/0046 |
| 2019/0157640 | A1* | 5/2019 | Farha | H01M 2/1077 |

FOREIGN PATENT DOCUMENTS

| | | |
|---|---|---|
| DE | 102015010983 A1 | 2/2017 |
| DE | 102015219280 A1 | 4/2017 |

* cited by examiner

C-C

BATTERY HAVING A PLURALITY OF BATTERY CELLS

BACKGROUND OF THE INVENTION

The invention proceeds from a battery having a plurality of battery cells.

It is known from the prior art that batteries, in particular lithium-ion batteries, comprise at least one battery module, or advantageously also more than one battery module. In addition, a battery module preferably has a multiplicity of individual battery cells, which are connected to one another to form the battery module, wherein the individual battery cells can be connected to one another in series and/or in parallel by means of cell connectors. A temperature-control device is needed here in order for it to be possible for the battery cells to be operated within a predetermined temperature range.

US 2016/0226053 describes a battery having two battery modules with battery cells which are arranged in alternating fashion and are electrically connected to one another in each case in series and/or in parallel.

DE 10 2013 218 489 discloses a battery module having a plurality of battery cells around which a cooling fluid flows.

SUMMARY OF THE INVENTION

The battery having a plurality of battery cells with the features of the invention has the advantage that reliable temperature control of a plurality of cells of the battery is possible.

For this purpose, the invention provides a battery having a plurality of battery cells. The battery cells here are, in particular lithium-ion battery cells.

The battery here has a plurality of first battery cells, which are electrically connected to one another in series and/or in parallel.

The battery here has a plurality of second battery cells, which are electrically connected to one another in series and/or in parallel.

The first battery cells here each have a first outer surface and the second battery cells here each have a second outer surface.

In addition, the housing of the battery has a first housing wall and a second housing wall. The first housing wall here is arranged opposite the second housing wall.

A first flow channel is formed between the first wall of the housing and the first outer surface of one of the first battery cells, and a second flow channel is formed between the second wall of the housing and the second outer surface of one of the second battery cells.

The measures given in the dependent claims provide for advantageous developments and improvements of the invention.

It is thus preferably possible to provide a battery in which battery cells are arranged, for example, in a first group and in a second group, wherein only the battery cells of the first group are connected electrically to one another in series and/or in parallel and, in addition, only the battery cells of the second group are electrically connected to one another in series and/or in parallel.

It is possible here for the first battery cells of the first group and the second battery cells of the second group to be reliably temperature-controlled by means of a temperature-control fluid flowing through the first flow channel and the second flow channel.

In particular, the temperature-control fluid is a dielectric fluid, and therefore any additional insulation of the battery cells can be dispensed with.

Advantageously, in each case a first flow channel is formed between the first wall of the housing and the first outer surface of each of the first battery cells, and in each case a second flow channel is formed between the second wall of the housing and the second outer surface of each of the second battery cells.

It is thus possible for each of the first battery cells and each of the second battery cells to be reliably temperature-controlled by temperature-control fluid flowing through the first flow channels and the second flow channels.

It is expedient if the first housing wall and the first outer surface delimit the first flow channel directly, and/or if the second housing wall and the second outer surface limit the second flow channel directly.

This provides for a straightforward construction of the battery, wherein, at the same time, the direct delimitation of the first flow channel by the first outer surface and/or the direct delimitation of the second flow channel by the second outer surface provides for a reliable transfer of heat from the first battery cell and/or the second battery cell to a temperature-control fluid flowing in the first flow channel and/or in the second flow channel. It is thus possible for the respective battery cell to be subjected to fluid temperature control directly and in a manner which optimizes installation space.

According to an advantageous aspect of the invention, a first spring element is arranged between the first housing wall and the first outer surface.

The first spring element here is preferably of elastically and/or plastically deformable design.

According to the advantageous aspect of the invention, a second spring element is preferably also arranged between the second housing wall and the second outer surface.

The second spring element here is preferably of elastically and/or plastically deformable design.

It is thus possible to accommodate the first battery cell and/or the second battery cell in a reliable manner in the housing of the battery. In addition, this provides the advantage that the first spring element and the second spring element are arranged within the first flow channel and within the second flow channel, respectively, as a result of which the first spring element and the second spring element can additionally influence a flow of temperature-control fluid flowing through the first flow channel and the second flow channel, and in particular can increase the turbulence properties of said fluid, as a result of which the transfer of heat can advantageously be increased.

It is possible here, for example, for the first battery cell to comprise the first spring element or for the first housing wall to comprise the first spring element.

It is possible here, for example, for the second battery cell to comprise the second spring element or for the second housing wall to comprise the second spring element.

This provides, overall, for a straightforward construction of the battery.

According to a preferred embodiment of the invention, a first battery cell is arranged between two second battery cells.

In addition, according to the preferred embodiment of the invention, a second battery cell is arranged between two first battery cells.

In particular, the first battery cells and the second battery cells are arranged in alternating fashion in a longitudinal direction of the battery.

This provides for reliable temperature control of the first battery cells and of the second battery cells along with, at the same time, straightforward series and/or parallel electrical connection in each case of the first battery cells to one another and in each case of the second battery cells to one another, since the distances between the individual first battery cells and individual second battery cells are not too great.

Advantageously, the first battery cells each have a first first voltage tap and a first second voltage tap.

The first first voltage tap and the first second voltage tap here are arranged on a first end surface of the respective first battery cell, said first end surface being located opposite the first outer surface.

Advantageously, the second battery cells each have a second first voltage tap and a second second voltage tap.

The second first voltage tap and the second second voltage tap here are arranged on a second end surface of the respective second battery cell, said second end surface being located opposite the second outer surface.

It is thus possible to form a battery in which the electrically conductive series and/or parallel connections between the respective voltage taps of the first battery cells and of the second battery cells can be formed on a side located opposite the flow channel.

In addition, the housing of the battery preferably has a plurality of partition walls. The partition walls here are arranged in a longitudinal direction of the battery in each case between two cells of the battery. The partition walls are also arranged between the first housing wall and the second housing wall.

A flow channel is formed here between a partition wall and a first battery cell or second battery cell directly adjacent to the partition wall.

It is thus possible to subdivide the housing of the battery into individual accommodating spaces for the respective battery cells and, at the same time, also to provide for large-surface-area flow around the individual battery cells by a temperature-control fluid.

It should also be noted here that, of course, it is also possible for the battery to be designed without partition walls.

Both in the case of the housing of the battery being designed with partition walls and in the case of the housing of the battery being designed without partition walls, it is possible for two battery modules to be arranged within just one housing of the battery. A battery module here is intended to mean a plurality of first battery cells and second battery cells electrically connected to one another in series and/or in parallel. It is possible here to reduce the distance between the battery cells to a minimum defined by necessary swelling distances, wherein in particular the arrangement of a partition wall or the use of a dielectric fluid can ensure that the cells are insulated.

In addition, alongside the amount of installation space required being reduced, it is advantageously also possible to dispense with high-outlay bracing concepts.

In addition, it is also preferable here if the partition walls each comprise an opening designed for the through-passage of temperature-control fluid.

It is thus possible for temperature-control fluid to flow around a plurality of battery cells separated by partition walls.

According to a preferred aspect of the invention, the second housing wall has a respective first accommodating opening for one of the first battery cells.

It is possible here for the respective first battery cell to be arranged, by means of the first accommodating opening, within the housing of the battery, wherein a respective first battery cell can be pushed into the housing for example through the first accommodating opening.

In addition, the first housing wall has a respective second accommodating opening for one of the second battery cells.

It is possible here for the respective second battery cell to be arranged, by means of the second accommodating opening, within the housing of the battery, wherein a respective second battery cell can be pushed into the housing for example through the second accommodating opening.

The first battery cells and/or the second battery cells here are accommodated in the housing of the battery in each case such that the first first voltage taps and the first second voltage taps of the first battery cell and/or the second first voltage taps and the second second voltage taps of the second battery cell are accessible from the surroundings of the battery.

It is thus straightforwardly possible for the individual first battery cells to be electrically connected to one another in series and/or in parallel and for the individual second battery cells to be electrically connected to one another in series and/or in parallel.

Advantageously, the battery also comprises a cover element which can fasten the first battery cells and the second battery cells, in addition, in the housing of the battery.

This provides for reliable fastening of the plurality of battery cells within the housing of the battery.

In addition, the battery has a sealing element which can seal an interior of the housing of the battery in relation to the surroundings of the battery, said interior having temperature-control fluid flowing through it.

It is thus possible, for example, for the safety and reliability of the battery module to be further increased.

On account of the reliable temperature control of the battery cells, a battery according to the invention also provides the advantage that it is also possible for gas exiting from the battery cells through a discharge device to be reliably and rapidly cooled.

BRIEF DESCRIPTION OF THE DRAWINGS

Embodiments of the invention will be explained in more detail in the following description and are illustrated in the drawings, in which.

DETAILED DESCRIPTION

Figure 1:
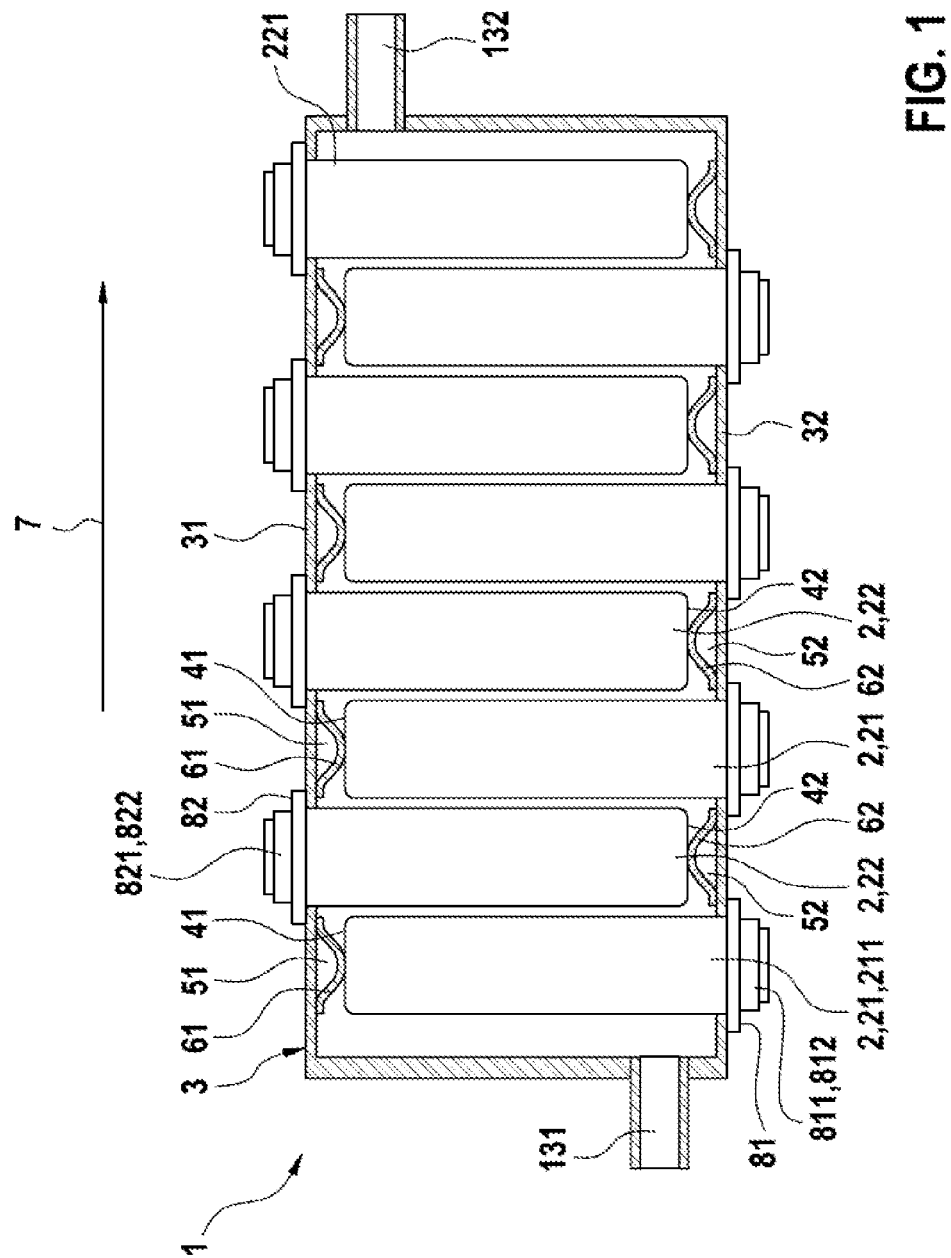
FIG. 1 shows, schematically, a plan view of a battery according to the invention having a plurality of battery cells.

FIG. 1 shows a schematic plan view of a battery 1 according to the invention.

The battery 1 has a plurality of battery cells 2, wherein the battery cells 2 are, in particular, lithium-ion battery cells.

In addition, the battery 1 has a housing 3, in which the plurality of battery cells 2 are accommodated.

The battery 1 has a plurality of first battery cells 21 and a plurality of second battery cells 22.

The plurality of first battery cells 21 here are electrically connected to one another in series and/or in parallel for example by first cell connectors (not illustrated in FIG. 1).

The plurality of second battery cells 22 here are electrically connected to one another in series and/or in parallel for example by second cell connectors (not illustrated in FIG. 1).

The first battery cells 21 here each have a first outer surface 41. The second battery cells 22 here each have a second outer surface 42.

The housing 3 of the battery 1, in addition, has a first housing wall 31 and a second housing wall 32. The first housing wall 31 here is arranged opposite the second housing wall 32.

As illustrated schematically in FIG. 1, a first flow channel 51 is formed between the first wall 31 of the housing 3 and the first outer surface 41 of one of the first battery cells 21.

In particular, in the case of the exemplary embodiment shown in FIG. 1, a respective first flow channel 51 is formed between the first wall 31 of the housing 3 and the first outer surface 41 of each of the first battery cells 21.

As illustrated schematically in FIG. 1, a second flow channel 52 is formed between the second wall 32 of the housing 3 and the second outer surface 42 of one of the second battery cells 22.

In particular, in the case of the exemplary embodiment shown in FIG. 1, a respective second flow channel 52 is formed between the second wall 32 of the housing 3 and the second outer surface 42 of each of the second battery cells 22.

In addition, FIG. 1 shows that the first housing wall 31 and the first outer surfaces 41 delimit in each case the respective first flow channel 51 directly.

In addition, FIG. 1 also shows that the second housing wall 32 and the second outer surfaces 42 delimit in each case the respective second flow channel 52 directly.

In addition, in the case of the exemplary embodiment shown in FIG. 1, a first spring element 61, which is of elastically and/or plastically deformable design, is arranged between the first wall 31 of the housing 3 of the battery 1 and the first outer surface 41.

In addition, in the case of the exemplary embodiment shown in FIG. 1, a second spring element 62, which is of elastically and/or plastically deformable design, is arranged between the second wall 32 of the housing 3 of the battery 1 and the second outer surface 42.

With the exception of the first battery cell 211 arranged at the left-hand periphery, each first battery cell 21 is arranged in each case between two second battery cells 22 and, with the exception of the second battery cell 221 arranged at the right-hand periphery, each second battery cell 22 is arranged between two first battery cells 21.

It is therefore the case that the first battery cells 21 and the second battery cells 22 are arranged in alternating fashion in a longitudinal direction 7 of the battery 1. As seen in the longitudinal direction 7, in each case a second battery cell 22 follows a first battery cell 21 and a first battery cell 21 follows a second battery cell 22.

In addition, it can also be seen from FIG. 1 that the first battery cells 21 each have a first voltage tap on an end surface 81, which is located opposite the first outer surface 41. As will also be described in conjunction with the rest of the figures, the first battery cells 21 each have a first first voltage tap 811 and a first second voltage tap 812.

In addition, it can also be seen from FIG. 1 that the second battery cells 22 each have a second voltage tap on an end surface 82, which is located opposite the second outer surface 42. As will also be described in conjunction with the rest of the figures, the second battery cells 22 each have a second first voltage tap 821 and a second second voltage tap 822.

FIG. 1 here shows an embodiment without partition walls, in which temperature-control fluid can flow through the interior of the housing 3.

Figure 2:
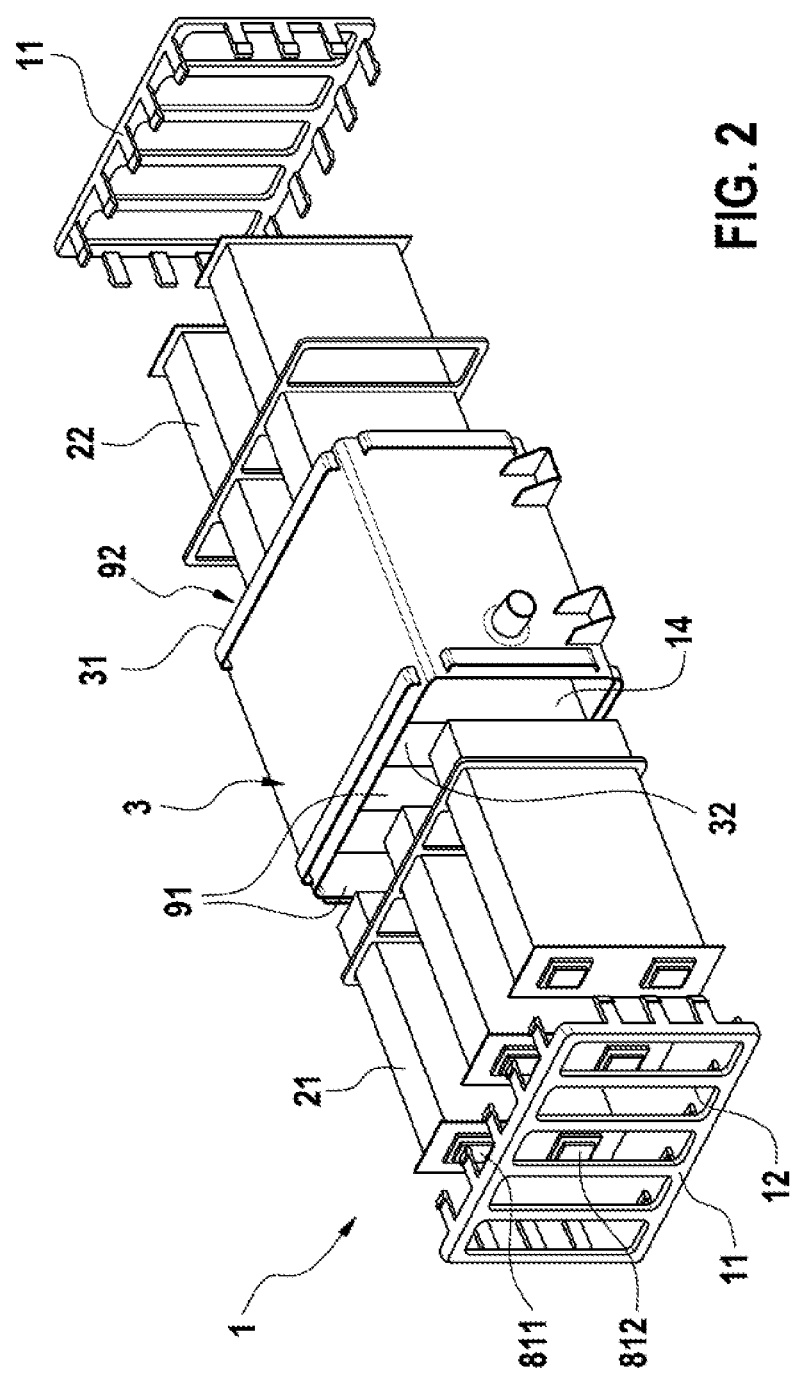
FIG. 2 shows a perspective view of an exploded illustration of a battery according to the invention having a plurality of battery cells.

FIG. 2 shows, in perspective, an exploded illustration of a battery 1 according to the invention.

FIG. 2 here shows, first of all, that the first battery cells 21 have a first first voltage tap 811 and a first second voltage tap 812.

It can also be seen from FIG. 2 here that the second housing wall 32 comprises respective first accommodating openings 91, which are each designed for accommodating a first battery cell 21. In addition, the first housing wall 31 comprises respective second accommodating openings 92, which are each designed for accommodating a second battery cell 22.

It is possible here for the first battery cells 21 to be pushed, in particular, into the respective first accommodating opening 91 and for the second battery cells 22 to be pushed, in particular, into the respective second accommodating opening 92.

The first first voltage taps 811, the first second voltage taps 812, the second first voltage taps 821 and the second second voltage taps 822 here are accessible in each case from the surroundings 10 of the housing 3 of the battery 1.

In addition, the battery 1 also has a cover element 11 which is designed for fastening the first battery cells 21 and the second battery cells 22. The cover element 11 here has respective openings 12, which can be arranged relative to a respective battery cell 21, 22 such that the respective voltage taps are accessible from the surroundings 10 of the battery.

Figure 3:
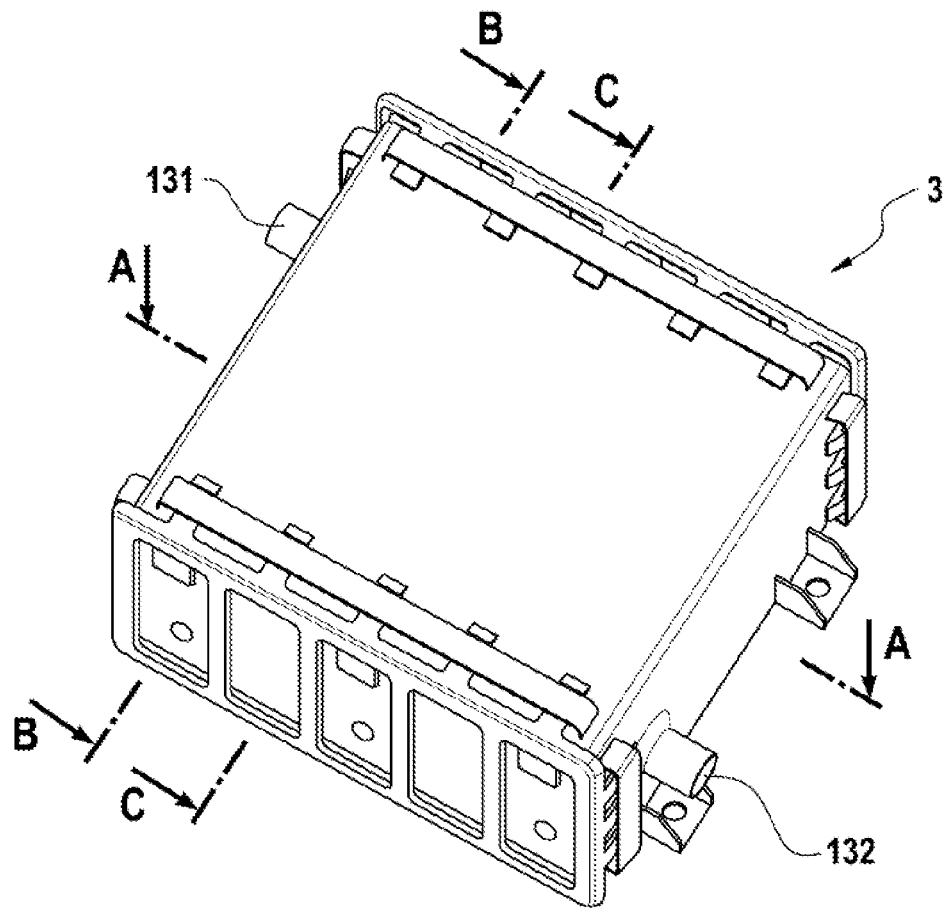
FIG. 3 shows a perspective view of a battery.

FIG. 3 shows a perspective view of an assembled battery 1, which was shown in the exploded illustration in FIG. 2.

It should also be noted here that the battery 1, and in particular the housing 3 of the battery 1, has a first connection 131, which is designed for supplying temperature-control fluid into the housing 3 of the battery 1, and a second connection 132, which is designed for discharging temperature-control fluid from the housing of the battery 3.

Figure 4:
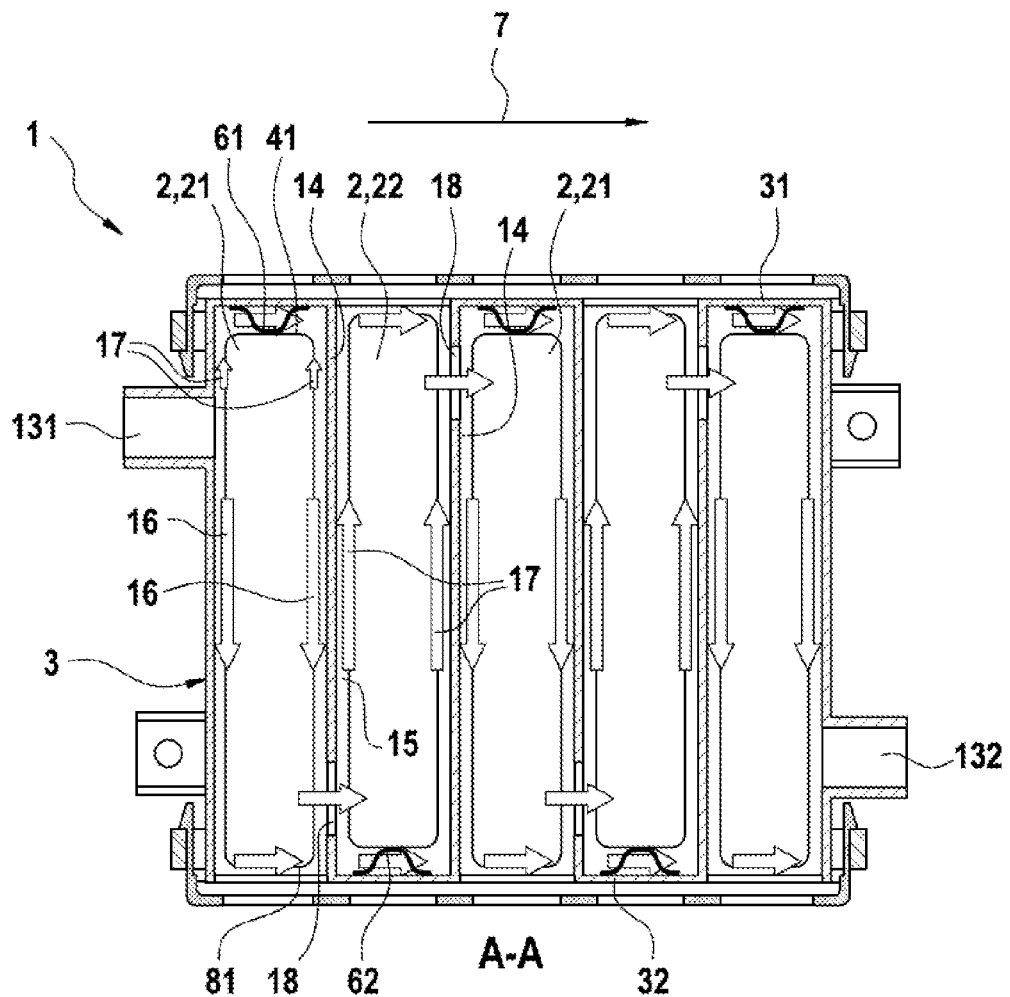
FIG. 4 shows a plan view of the section A-A through the embodiment of the battery according to FIG. 3.

FIG. 4 shows a plan view of the section A-A through the embodiment of the battery 1 according to FIG. 3.

It can be seen here, first of all, that the housing 3 of the battery 1 comprises a plurality of partition walls 14. The partition walls 14, which can also be seen in FIG. 2, are arranged in the longitudinal direction 7 of the battery 1 in each case between two cells 2, 21, 22 of the battery 1.

In addition, the partition walls 14 are arranged in each case between the first housing wall 31 and the second housing wall 32. A respective flow channel 15 is formed here between a partition wall 14 and a first battery cell 21 or second battery cell 22 directly adjacent to the partition wall 14.

FIG. 4 will now be used to explain the flow guidance within the housing 3 of a battery 1 according to the invention.

The temperature-control fluid flows into the interior of the housing 3 through the first connection 131.

The temperature-control fluid then flows around the first battery cell 21.

The temperature-control fluid here in particular also flows through the flow channels 15. In addition, it is also possible for the temperature-control fluid to flow preferably above and beneath the first battery cell 21.

In particular, the temperature-control fluid flows along the direction 16 shown in the direction of the first end surface 81 of the first battery cell 21 and along the direction 17 shown in the direction of the first outer surface 41.

It is possible here for the temperature-control fluid to flow both above and beneath the first battery cell 21 and also to flow along the side surfaces of the first battery cells 21, through the flow channel 15.

In addition, the temperature-control fluid then flows through an opening 18 of the partition wall 14, in order then to flow around a second battery cell 22.

The temperature-control fluid here flows in particular along the direction 17 shown in the direction of the second end surface 82 of the second battery cell 22. In addition, it is also possible for the temperature-control fluid to flow above and beneath the second battery cell 22.

The temperature-control fluid then flows through an opening 18 of the partition wall 14, in order then to flow around a further first battery cell 21.

The temperature-control fluid thus flows in particular in meandering fashion through the entire housing 3 of the battery 1.

Finally, the temperature-control fluid flows out of the housing 3 of the battery 1 through the connection 132.

It should be noted here that temperature-control fluid can also flow in meandering fashion through that embodiment of the battery 1 which is shown in FIG. 1.

Figure 5A:
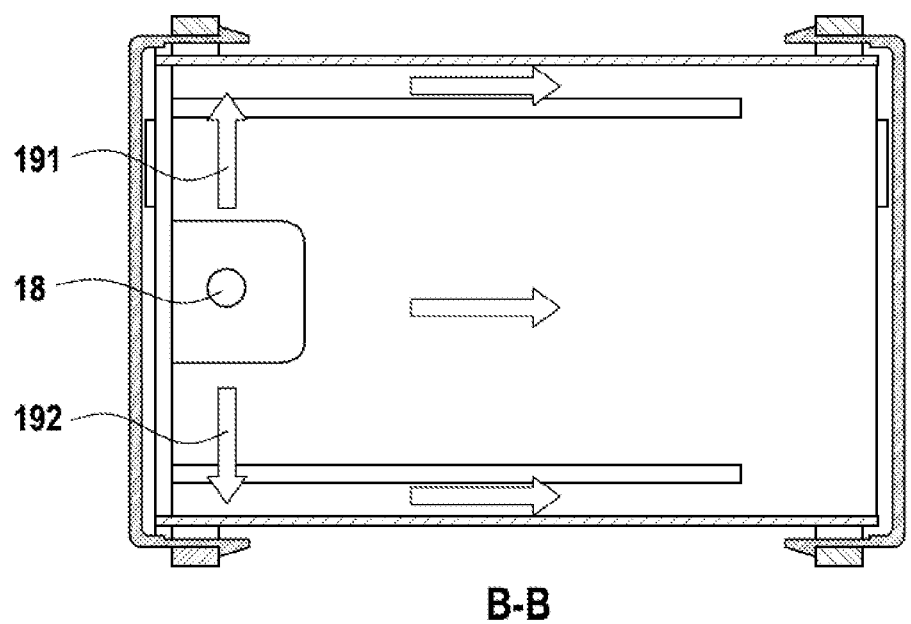
FIG. 5A shows a side view of the section B-B through the embodiment of the battery according to FIG. 3.

FIG. 5A shows the section B-B through the battery 1 according to FIG. 3.

Figure 5B:
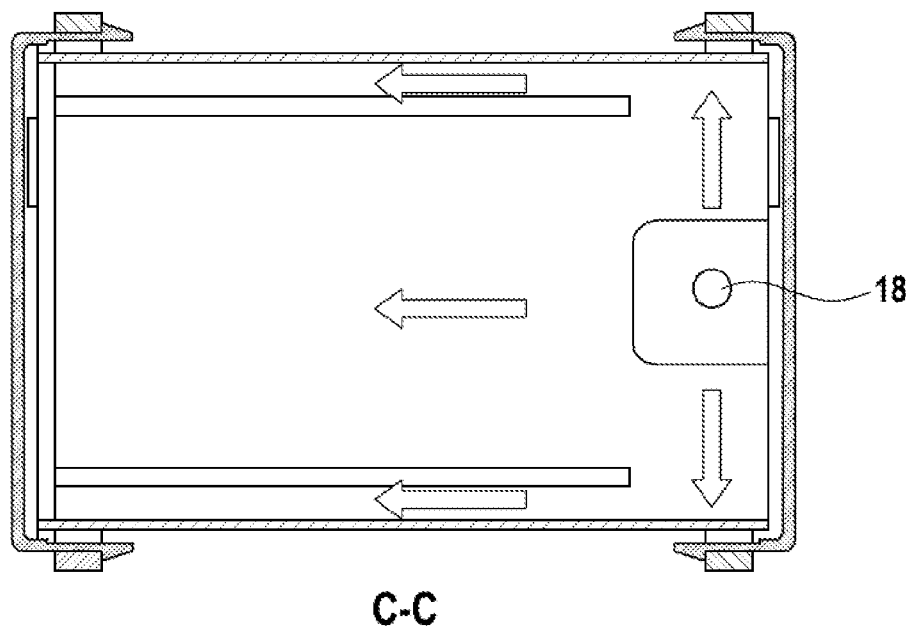
FIG. 5B shows a side view of the section C-C through the embodiment of the battery according to FIG. 3.

FIG. 5B shows the section C-C through the battery 1 according to FIG. 3.

It is possible here to see the opening 18 of a partition wall 14, it being possible for temperature-control fluid to flow through said opening.

FIGS. 5A and 5B here each show that the temperature-control fluid can flow both above and beneath a battery cell and through the flow channels 15. In particular, it should also be noted here that the openings 18 are preferably adjacent to the first flow channel 51 and the second flow channel 52 with the first spring elements 61 and the second spring elements 62, respectively, as a result of which the spring elements 61, 62 can ensure an increase in the turbulence of the flow.

In particular, the temperature-control fluid flows in the first flow channels 51 and the second flow channels 52 from top to bottom, which is intended to mean, as seen in relation to FIGS. 1 and 4, toward the person looking at the figure and away from the person looking at the figure, respectively, and, as seen in relation to FIGS. 5 A and 5 B, respectively upward and downward along the directions 191, 192 shown.

Figure 6:
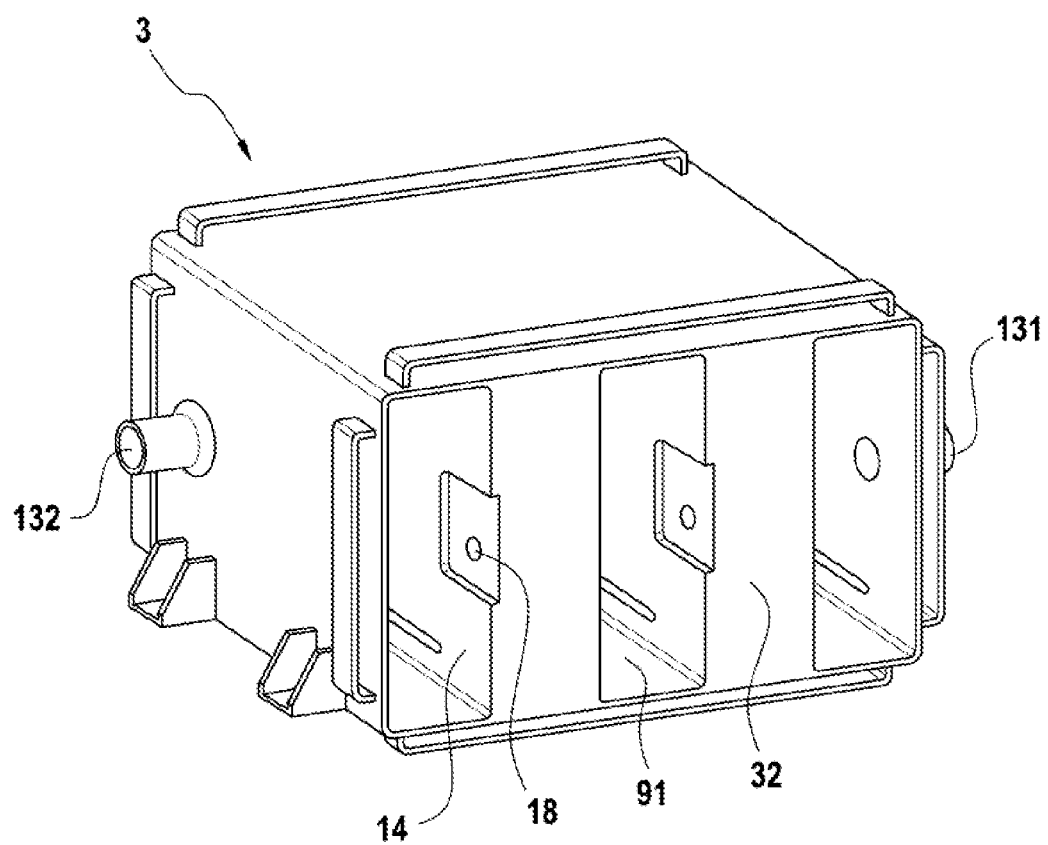
FIG. 6 shows a perspective illustration of a housing 3 of a battery according to the invention.

FIG. 6 shows a perspective view of a housing 3 of a battery 1.

FIG. 6 depicts, in particular, the second housing wall 32, which has first accommodating openings 91 for the first battery cells 21.

In addition, it can also be seen from FIG. 6 that the housing 3 has partition walls 14, which each have an opening 18 for the through-passage of temperature-control fluid.

In addition, it is also possible to see the first connection 131 and the second connection 132.

The invention claimed is:

1. A battery comprising a plurality of battery cells (2) accommodated in a housing (3), the battery cells (2) including a plurality of first battery cells (21) and a plurality of second battery cells (22), wherein
   the first battery cells (21) are electrically connected to one another in series and/or in parallel, and the second battery cells (22) are electrically connected to one another in series and/or in parallel,
   the first battery cells (21) each have a first outer surface (41) and the second battery cells (22) each have a second outer surface (42),
   the housing (3) has a first housing wall (31) and a second housing wall (32), which is arranged opposite the first housing wall (31),
   a first flow channel (51) is formed between the first housing wall (31) and the first outer surface (41) of one of the first battery cells (21), the first flow channel being configured to conduct a temperature-control fluid,
   a second flow channel (52) is formed between the second housing wall (32) and the second outer surface (42) of one of the second battery cells (22), the second flow channel being configured to conduct the temperature-control fluid,
   the first outer surface (41) of one of the first battery cells (21) directly delimits the first flow channel (51) and the second outer surface (42) of one of the second battery cells (22) directly delimits the second flow channel (52), and
   a third flow channel (15) is formed generally perpendicular to the first flow channel (51) and the second flow channel (52) and between the one of the first battery cells and the one of the second battery cells (21, 22), the third flow channel being configured to conduct the temperature-control fluid between the first flow channel (51) and the second flow channel (52).

2. The battery according to claim 1, characterized in that a respective first flow channel (51) is formed between the first wall (31) of the housing (3) and the first outer surface (41) of each of the first battery cells (21), and in that
a respective second flow channel (52) is formed between the second wall (32) of the housing (3) and the second outer surface (42) of each of the second battery cells (22).

3. The battery according to claim 1, characterized in that the first housing wall (31) and the first outer surface (41) of one of the first battery cells (21) delimit the first flow channel (51) directly, and/or in that the second housing wall (32) and the second outer surface (42) of one of the second battery cells (22) delimit the second flow channel (52) directly.

4. The battery according to claim 1, characterized in that an elastically and/or plastically deformable first spring element (61) is arranged between the first housing wall (31) and the first outer surface (41) of one of the first battery cells (21), and/or in that
an elastically and/or plastically deformable second spring element (62) is arranged between the second housing wall (32) and the second outer surface (42) of one of the second battery cells (22).

5. The battery according to claim 4, characterized in that one of the first battery cells (21) or the first housing wall (31) comprises the first spring element (61), and/or in that one of the second battery cells (22) or the second housing wall (32) comprises the second spring element (62).

6. The battery according to claim 1, characterized in that one of the first battery cells (21) is arranged between two of the second battery cells (22), and/or in that one of the second battery cells (22) is arranged between two of the first battery cells (21).

7. The battery according to claim 6, characterized in that the first battery cells (21) and the second battery cells (22) are arranged in alternating fashion in a longitudinal direction (7) of the battery (1).

8. The battery according to claim 1, characterized in that the first battery cells (21) each have a first first voltage tap (811) and a first second voltage tap (812), which are arranged on a first end surface (81) of the respective first battery cell (21), said first end surface being located opposite the first outer surface (41), and/or in that the second battery cells (22) each have a second first voltage tap (821) and a second second voltage tap (822), which are arranged on a second end surface (82) of the respective second battery cell (22), said second end surface being located opposite the second outer surface (42).

9. The battery according to claim 8, characterized in that the second housing wall (32) has a respective first accommodating opening (91) for one of the first battery cells (21), and/or in that the first housing wall (31) has a respective second accommodating opening (92) for one of the second battery cells (22),
wherein the first battery cells (21) and/or the second battery cells (22) are accommodated in the housing (3) of the battery (1) such that the first first voltage taps (811) and the first second voltage taps (812) and/or the second first voltage taps (821) and the second second voltage taps (822) are accessible from the surroundings (10) of the battery (1).

10. The battery according to claim 1, characterized in that the housing (3) of the battery (1) comprises a plurality of partition walls (14) which extend from the first housing wall to the second housing wall and are spaced in a longitudinal direction (7) of the battery (1) in each case between two of the battery cells (2) of the battery (1) and which are also arranged between the first housing wall (31) and the second housing wall (32), and wherein
the third flow channel (15) is formed between a partition wall (14) and one of the first battery cells (21) or second battery cells (22) directly adjacent to the partition wall (14).

11. The battery according to claim 10, characterized in that
the partition walls (14) each comprise an opening (18) configured for the through-passage of temperature-control fluid.

12. The battery according to claim 1, characterized in that the battery (1) comprises a cover element (11) configured for fastening the first battery cells (21) and the second battery cells (22).

13. The battery according to claim 1, characterized in that the battery (1) has a sealing element which is configured for sealing an interior of the housing (3) of the battery (1) in relation to the surroundings (10) of the battery, such that temperature-control fluid can flow through said interior.

14. The battery according to claim 11, characterized in that each opening (18) of the partition walls (14) is adjacent to the first flow channel (51) or the second flow channel (52), and that the openings (18) are arranged in alternating fashion in the longitudinal direction (7) of the battery (1).

15. The battery according to claim 10, characterized in that a respective flow channel (15) is formed between each one of the partition walls (14) and each adjacent first battery cell (21) or each adjacent second battery cell (22).

16. The battery according to claim 7, characterized in that the first flow channel (51) is between the first housing wall (31) and the first outer surfaces (41) of each of the first battery cells (21), the second flow channel (52) is between the second housing wall (32) and the second outer surfaces (42) of each of the second battery cells (22), and the third flow channel (15) is between each adjacent pair of the plurality of battery cells (2).

17. A battery comprising a plurality of battery cells (2) accommodated in a housing (3), the battery cells (2) including a plurality of first battery cells (21) and a plurality of second battery cells (22), wherein
the first battery cells (21) are electrically connected to one another in series and/or in parallel, and the second battery cells (22) are electrically connected to one another in series and/or in parallel,
the first battery cells (21) each have a first outer surface (41) and the second battery cells (22) each have a second outer surface (42),
the housing (3) has a first housing wall (31) and a second housing wall (32), which is arranged opposite the first housing wall (31),
a first flow channel (51) is formed between the first housing wall (31) and the first outer surface (41) of one of the first battery cells (21),
a second flow channel (52) is formed between the second housing wall (32) and the second outer surface (42) of one of the second battery cells (22),
the first battery cells (21) each have a first first voltage tap (811) and a first second voltage tap (812), which are arranged on a first end surface (81) of the respective first battery cell (21), said first end surface being located opposite the first outer surface (41), and/or in that the second battery cells (22) each have a second first voltage tap (821) and a second second voltage tap (822), which are arranged on a second end surface (82) of the respective second battery cell (22), said second end surface being located opposite the second outer surface (42),
the second housing wall (32) has a respective first accommodating opening (91) for one of the first battery cells (21), and/or in that the first housing wall (31) has a respective second accommodating opening (92) for one of the second battery cells (22), and
the first battery cells (21) and/or the second battery cells (22) are accommodated in the housing (3) of the battery (1) such that the first first voltage taps (811) and the first second voltage taps (812) and/or the second first voltage taps (821) and the second second voltage taps (822) are accessible from the surroundings (10) of the battery (1).

18. A battery comprising a plurality of battery cells (2) accommodated in a housing (3), the battery cells (2) including a plurality of first battery cells (21) and a plurality of second battery cells (22), wherein
the first battery cells (21) are electrically connected to one another in series and/or in parallel, and the second battery cells (22) are electrically connected to one another in series and/or in parallel, the first battery cells (21) each have a first outer surface (41) and the second battery cells (22) each have a second outer surface (42), the housing (3) has a first housing wall (31) and a second housing wall (32), which is arranged opposite the first housing wall (31), a first flow channel (51) is formed between the first housing wall (31) and the first outer surface (41) of one of the first battery cells (21), a second flow channel (52) is formed between the second housing wall (32) and the second outer surface (42) of one of the second battery cells (22), and the first battery cells (21) each have a first first voltage tap (811) and a first second voltage tap (812), which are arranged on a first end surface (81) of the respective first battery cell (21), said first end surface being located opposite the first outer surface (41), and/or in that the second battery cells (22) each have a second first voltage tap (821) and a second second voltage tap (822), which are arranged on a second end surface (82) of the respective second battery cell (22), said second end surface being located opposite the second outer surface (42).

\* \* \* \* \*